US008971236B2

(12) United States Patent
Dunas et al.

(10) Patent No.: US 8,971,236 B2
(45) Date of Patent: Mar. 3, 2015

(54) SYSTEM AND METHOD FOR REAL-TIME INTERCONNECTION OF ELEMENTS OF A WIDE AREA MONITORING, MEASUREMENT OR DATA COLLECTION SYSTEM THROUGH A DIRECT DIGITAL SATELLITE BROADCASTING MULTIPLEXING SYSTEM

(75) Inventors: Etienne Dunas, Toulouse (FR); Philippe Roghi, Cugnaux (FR)

(73) Assignee: Alcatel Lucent, Boulogne-Billancourt (FR)

( * ) Notice: Subject to any disclaimer, the term of this patent is extended or adjusted under 35 U.S.C. 154(b) by 3186 days.

(21) Appl. No.: 10/510,685

(22) PCT Filed: Apr. 9, 2002

(86) PCT No.: PCT/EP02/08063
§ 371 (c)(1),
(2), (4) Date: Feb. 16, 2005

(87) PCT Pub. No.: WO03/085860
PCT Pub. Date: Oct. 16, 2003

(65) Prior Publication Data
US 2005/0141445 A1    Jun. 30, 2005

(51) Int. Cl.
*H04B 7/185* (2006.01)
*H04B 7/212* (2006.01)
*H04B 7/19* (2006.01)

(52) U.S. Cl.
CPC ............ *H04B 7/18576* (2013.01); *H04B 7/185* (2013.01)
USPC .......... 370/316; 370/319; 370/323; 455/12.1; 455/13.1; 455/13.2

(58) Field of Classification Search
USPC .............. 455/3.02, 427, 430, 12.1, 13.1, 13.2
See application file for complete search history.

(56) References Cited

U.S. PATENT DOCUMENTS

| 4,259,741 | A | * | 3/1981 | Kawai ........................... 370/323 |
| 4,616,108 | A | * | 10/1986 | Yamaguchi et al. ......... 455/12.1 |
| 4,748,622 | A | * | 5/1988 | Muratani et al. .............. 370/326 |
| 5,101,267 | A | * | 3/1992 | Morales-Garza ............... 725/65 |
| 5,392,451 | A | * | 2/1995 | Schwendeman et al. .... 455/13.1 |
| 6,185,407 | B1 | * | 2/2001 | Watson ............................. 455/9 |
| 6,408,164 | B1 | * | 6/2002 | Lazaris-Brunner et al. . 455/12.1 |
| 6,437,734 | B1 | * | 8/2002 | McBurney et al. ...... 342/357.09 |
| 6,491,257 | B1 | * | 12/2002 | Emmons et al. ........... 244/158.6 |
| 6,498,922 | B1 | * | 12/2002 | Lazaris-Brunner et al. . 455/12.1 |
| 6,941,109 | B2 | * | 9/2005 | Matsushita et al. .......... 455/13.2 |
| 2002/0135511 | A1 | * | 9/2002 | Zhao et al. ............... 342/357.02 |

* cited by examiner

*Primary Examiner* — Huy C Ho
(74) *Attorney, Agent, or Firm* — Wolff & Samson

(57) ABSTRACT

System and a method for timely interconnecting elements of a wide spread remote measurement, monitoring or data collection system through multiplexing in a satellite system. The invention provides multiplexing features of a satellite system using on-board processing features to gather data from a plurality of remote monitoring stations (4) on any global navigation reference time and multiplex them into a single stream towards one or more computation centers. Each of said computation centers (3) has a down-link adapter (7) capable of extracting a channel from a down-link transmission of a satellite. The data from each of said remote monitoring stations (4) is also passed through an up-link adapter (5) so as to make it suitable for uplink transmission towards a DDBS satellite. Up-link and down-link adapters can be interconnected together to enable loop-back of information such as timing data to monitor transit times.

16 Claims, 5 Drawing Sheets

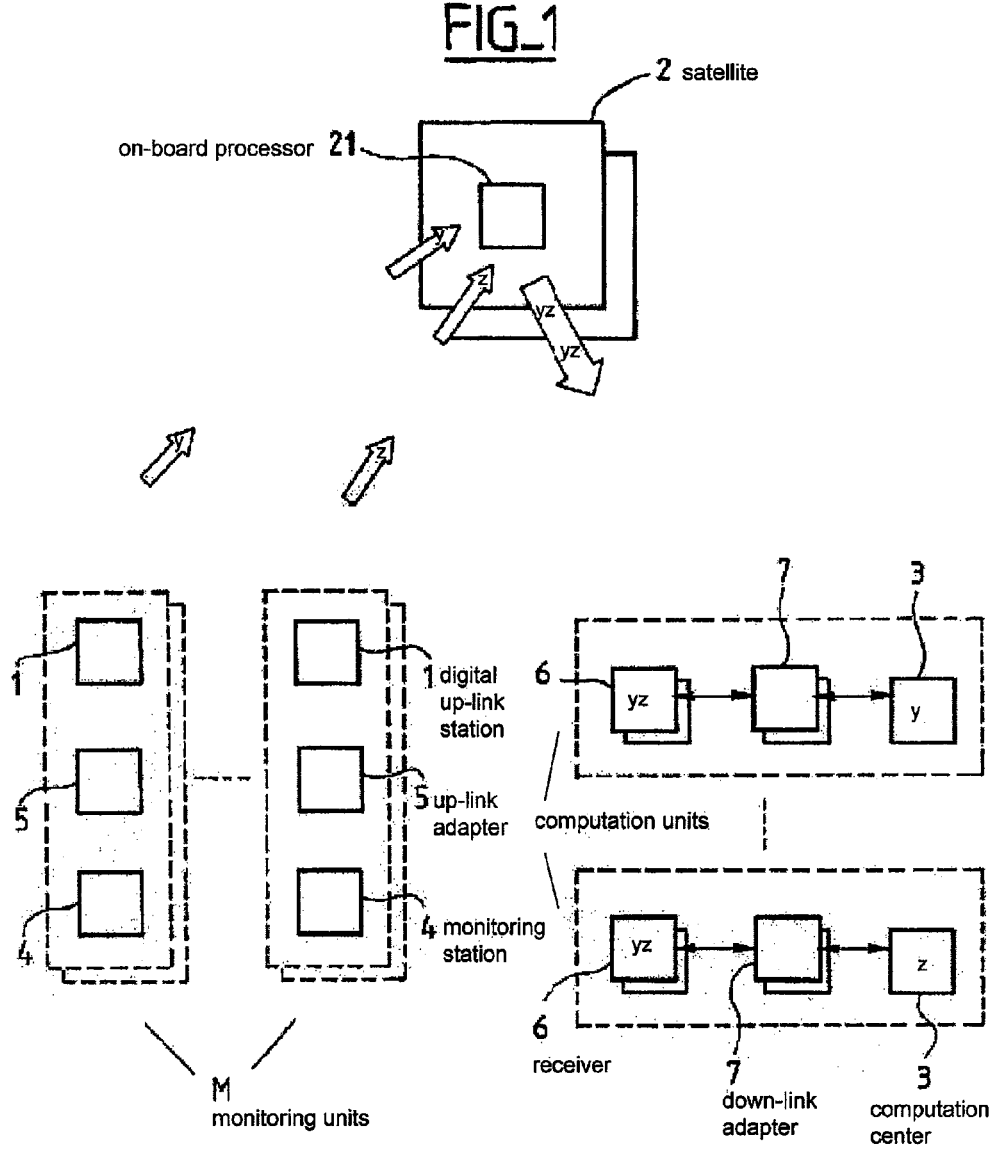

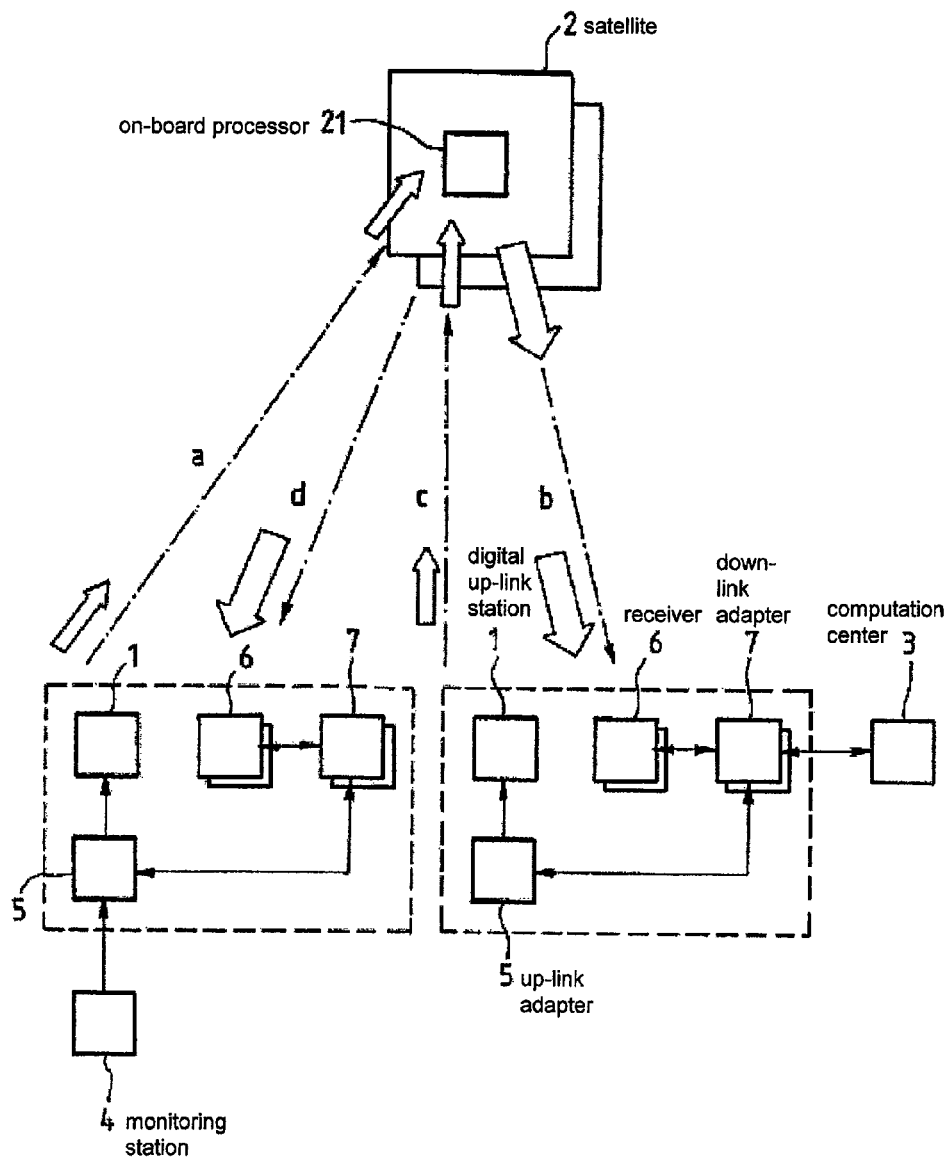

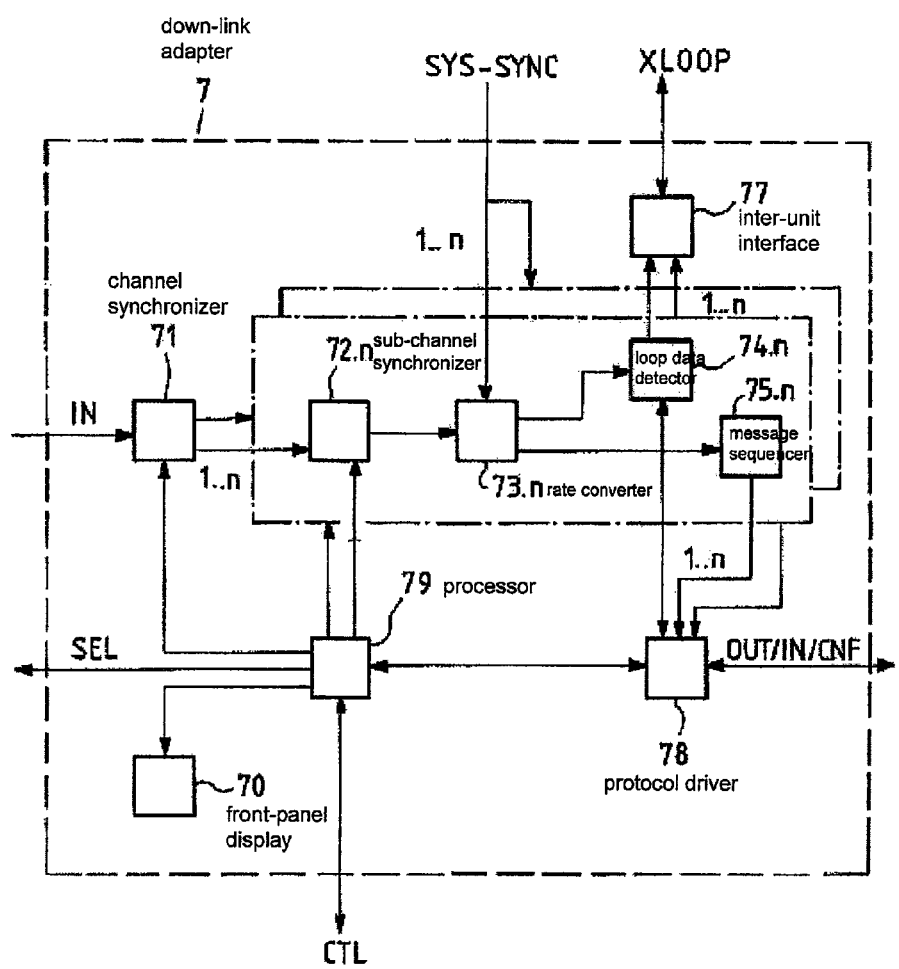
FIG_3

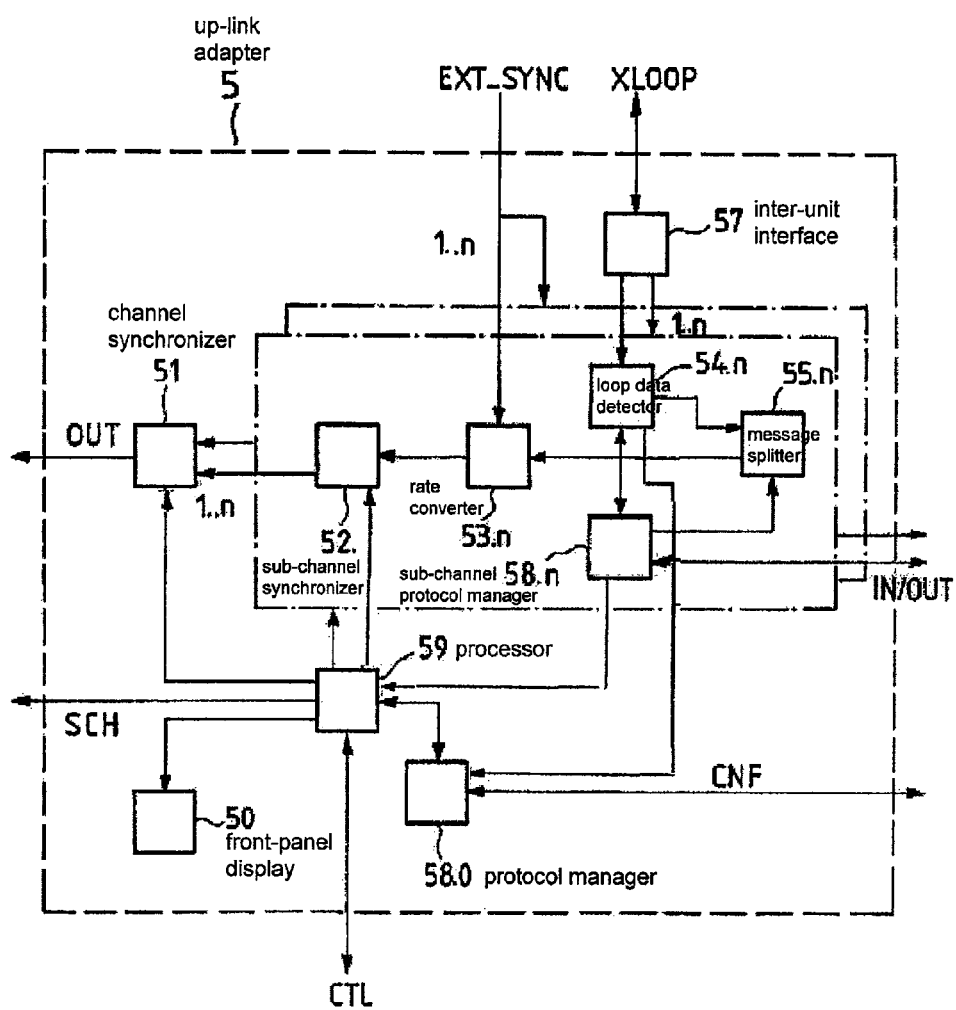

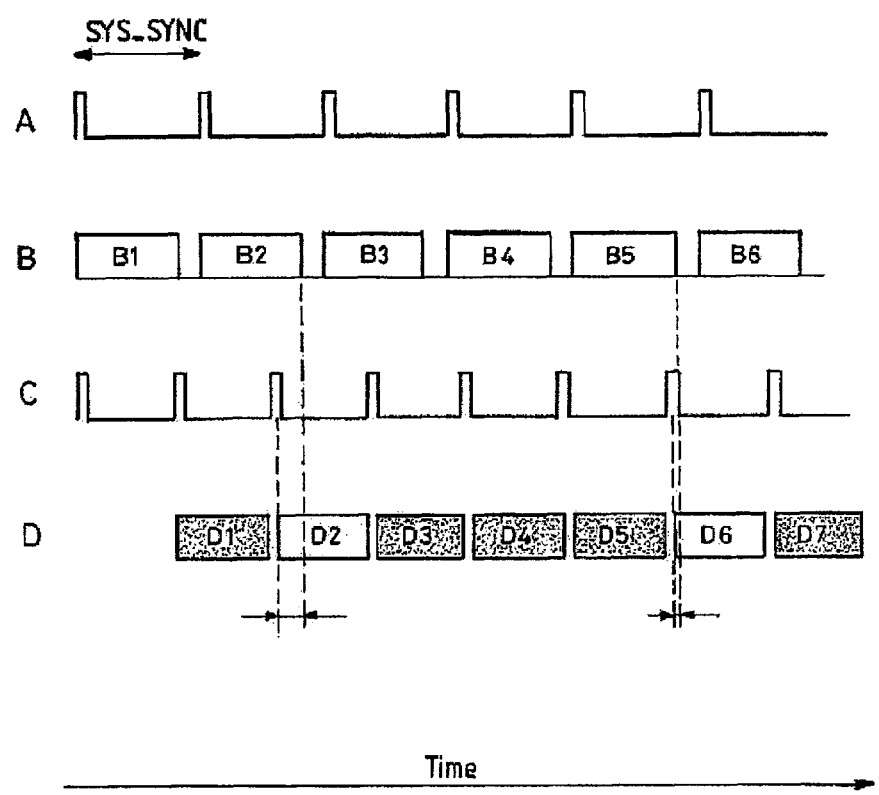

SYSTEM AND METHOD FOR REAL-TIME INTERCONNECTION OF ELEMENTS OF A WIDE AREA MONITORING, MEASUREMENT OR DATA COLLECTION SYSTEM THROUGH A DIRECT DIGITAL SATELLITE BROADCASTING MULTIPLEXING SYSTEM

The present invention relates to a system and a method for interconnecting elements of a wide spread monitoring, measurement or data collection (MMDC) system through multiplexing in a satellite system having on-board multiplexing capability, such as for example, a direct digital broadcasting satellite system (DDBS). The invention is in particular applicable, but not limited to, wide spread monitoring, measurement or data collection systems such as Navigation or Positioning Satellite Based Augmentation Systems which are typically in charge of determining specific features of a fleet of navigation satellites such as the systems known as GPS, GLONASS or Galileo. The invention takes benefit from both the burst nature of data transmitted and the on-board multiplexing features of such satellite systems. It thus enables to gather data coming from numerous remote measurement or monitoring stations and multiplex them into a single downlink stream, broadcast towards one or more computation centers, possibly working in parallel hot redundancy, while guaranteeing the overall end-to-end transit time, without re-routing of data. As it is discussed in further detail below, by means of the solution proposed by the present invention, the interconnection between remote monitoring stations and computation centers of the data collection system is obtained in an efficient and less complicated manner as compared to the conventional solutions known in the related art, whilst providing a deterministic and guaranteed transit time to all computation centers at the same time.

BACKGROUND OF THE INVENTION

Typical widespread monitoring, measurement or data collection systems such as Satellite Navigation Augmentation Systems use a number of ground based remote monitoring stations geographically spread over their service area. These stations monitor satellite constellation navigation signals, receiving data enabling them to compute the local time and coordinate of the satellite in a global datum, and provide data to one or more computation centers in charge of determining specific features of the satellite or satellite signals which are monitored. Because of the challenging figures required for data availability, continuity and integrity of service, such systems usually use several computation center working in parallel, but located at different places which may even be distributed over several countries.

As a consequence, it is desirable that the communication between the interconnections in such systems is maintained synchronous and that transit delay is guaranteed, while at the same time communication cost is reduced to a minimum. It is also desired that said operations are performed, without having to rely on a commercial third party worldwide data communication network which may well be of uncertain level of quality of service. Some of the known systems may also have time-critical or even human-safety critical applications such as commercial aeronautical navigation guidance elements or systems.

In addition, some of the existing service Level Agreements commercially available favor different trade-off within their architecture making transit time not a guaranteed feature, unless specially designed for such purpose; or make use of VSAT systems requiring complicated receiving VSAT hubs which finally degrade characteristics of VSAT links.

In order to avoid the above drawbacks, it is desired that data are collected from the numerous remote monitoring stations, widely spread over geographical areas, and are directly made available to several computation centers where such data are processed, with a guaranteed delivery time, preferably similar for all those centers. For some systems like navigation systems, the integrity and time-to-alarm performance are key parameters and conventional solutions available in the commercial telecommunication carrier technology are not considered to be well capable of providing such networking synchronous capability at reasonable costs. Using such systems needed to impose very stringent requirements on terrestrial data communication networks such as guaranteed availability, continuity, bit error rate and transit delay which increase their operating cost and make their design quite complex and sensitive to breaks or outages not very well under control.

Another solution known in the related art is the use of compact earth stations using relatively-small diameter antenna. These stations are known as Very Small Aperture Terminal (VSAT). The solution provided by VSATs enables to avoid landlines but requires multiplexing either at the transmitting or at the receiving side in the architecture. Such multiplexing hub generally requires a ground infrastructure with a larger antenna and also requires the renting of some bandwidth of a commercial satellite communication transponder specifically for the application. Also the conventional VSAT solution usually does not solve the problem of having parallel computers geographically distributed at different locations, having data which are delayed and re-broadcast to other centers, whilst they need to be processed in parallel, since VSAT systems usually require to be coordinated from one location at some point, which becomes a system single-point-of failure and is detrimental to the overall system availability.

Additionally, some applications require end-to-end acknowledgment of data or round-trip delay evaluation which cannot be easily achieved using one-way commercial VSAT systems.

Moreover, new applications are emerging requiring those remote monitoring stations to be located not only on ground, but also spread around oceans or even in orbiting spacecraft.

It is therefore desired to provide a solution for interconnecting elements of a wide area monitoring, measurement or data collection system avoiding final rerouting which could overcome all the above drawbacks.

DESCRIPTION OF THE INVENTION

The above objective is reached by using the solution proposed by the present invention according to which use is made of multiplexing features of a satellite system using on-board processing features—such as a direct digital satellite broadcasting system—to gather the data from the numerous remote monitoring stations, and combine them into a single satellite-down-link stream which is then broadcast over a wide region, where the computation centers are located, possibly working in parallel hot redundancy, through the use of low-cost receiver derived from mass-market applications such as audio broadcasting.

Direct digital satellite systems are one example of satellite systems having the capability of performing on-board multiplexing. It is to be understood that although in the following description, reference is repeatedly made to direct digital satellite broadcasting systems, the invention is not to be construed as limited to these systems and any other known system having the capacity of performing on-board multiplexing is to be understood to fall within the scope of this invention and applicable to the solution herewith proposed.

Direct digital satellite broadcasting systems were initially designed to broadcast digital radio, pictures or other relatively low-rate data now exist or are under development. These systems are able to process data directly coming from a number of up-link locations toward millions of low-cost receivers, whilst guaranteeing very low bit-error rates as needed to make transmission of video or music perceived as good-quality from a human point of view and have channel characteristics adapted to relatively low rate data, making the channel sufficiently cost-effective. Some of these systems do not require up-link data synchronization since their on-board processor have time-realignment capability.

According to the solution proposed by the present invention, the need to use a ground based conventional data communication network or to use a standard VSAT satellite data link point system is eliminated thus avoiding unnecessary round-trip delays, waste of time*bandwidth and re-routing between centers which are all drawbacks for an efficient and safe operation of the network.

Accordingly one object of the present invention is that of providing a satellite-based monitoring, measurement or data collection system comprising:

a monitoring, measurement or data collection system having a plurality of monitoring stations for remote monitoring, measurement or data collection and for providing data, to respective computation centers, and;

a satellite system using at least one satellite having an on-board processor for multiplexing up-link data received and broadcasting said multiplexed data in down-link transmission;

characterized in that at least one of said computation centers has at least one satellite receiver connected to a down-link adapter for extracting at least one digital channel from said satellite down-link transmission.

According to an aspect of the invention, each of said monitoring stations is connected through an up-link adapter to a satellite up-link broadcasting station.

According to another aspect of the invention, at least one of said monitoring stations has at least one channel from the up-link transmission allocated thereto.

According to still another aspect of the invention, several remote channels, or several monitoring stations are grouped together using sub-multiplexing channel capabilities of said digital direct broadcast satellite system.

Another object of the present invention is that of providing a down-link adapter for extracting at least one channel from a down-link transmission as proposed by the invention.

According to another aspect of the invention, said down-link adapter is capable of converting data framing from said satellite down-link data channel rate to message format and/or converting data rate to rate adapted to a cyclic data rate of said monitoring, measurement or data collection system. According to another object of the invention, there is provided an up-link adapter for converting signals received from a monitoring station of a monitoring, measurement or data collection system, into signals suitable for digital up-link transmission as proposed by the invention.

According to another aspect of the invention, said up-link adapter is capable of converting data message format from said monitoring station to an up-link format of said satellite system and/or converting data rate to an uplink rate adapted to said satellite system.

Another object of the present invention is that of providing a method for interconnecting elements of a monitoring, measurement or data collection using a satellite system, comprising:

remote monitoring, measurement or data collection by means of a plurality of monitoring stations and providing data to respective computation centers, and;

at least one satellite of said system multiplexing up-link data by means of an on-board processor and broadcasting said multiplexed data in down-link transmission;

characterized in that at least one of said computation centers extracts at least one digital channel from said satellite down-link transmission through a down-link adapter connected to at least one satellite receiver.

According to an aspect of the invention, an up-link broadcasting stations at each of said monitoring stations performs up-link broadcasting of data received from an up-link adapter connected thereto.

Another object of the present invention is that providing a method for interconnecting adapters as proposed by the invention, wherein data is returned from a down-link adapter to an up-link adapter transferring time information and/or data information between said adapters.

According to still another aspect of the invention a data message is delayed before being put into a next frame generated at a digital direct broadcast satellite channel rate, using a frame produced faster than needed by the rate of monitoring, measurement or data collection, thus giving rise to a so-called marker frame carrying data such as timing data.

According to yet another aspect of the invention, a transit time of a message from a time instant it is transmitted from an up-link adapter until a time instant it is received by a down-link adapter through a digital direct broadcast satellite is evaluated.

According to still another aspect of the invention, a computation center broadcasts through a digital direct broadcast satellite, to said monitoring stations by means of an up-link adapter incorporated therein and a monitoring station having a down-link adapter detects a channel specifically addressed thereto, providing data to said monitoring station, said data being usable for implementing a unicast, multicast or broadcast addressing scheme.

The up-link adapter as proposed herein, is able to recognize specific data from a remote monitoring station, convert them into specific framing and format as used for up-link transmission in said direct digital satellite broadcasting system. Said up-link adapter is also able of copying specific data into said satellite signaling channel for auxiliary use by the said direct digital satellite broadcasting system itself or receiver data compatible with such said system.

The down-link adapter as well as the up-link adapter are preferably capable of making use of either or both of UDP/IP and TCP/IP protocols to interconnect with the computation centers or the remote monitoring station equipment, respectively.

Furthermore, Optionally, data sent to DDBS system can be sent simultaneously to several DDBS satellites, and corresponding down-link transmission multiplex can be received in parallel by DDBS receivers, although not necessarily at all times, and not necessarily all at the same time.

The DDBS satellite has an on-board processor which is capable of multiplexing all up-link channels into one or more down-link channels, preferably using TDM. Furthermore a periodic frame marker is preferably used so as to provide time synchronization. Optionally MMDC computing centers are equipped with both down-link and up-link adapters to provide return loops to remote-monitoring stations.

Also, optionally messages back from computers centers are prefixed with remote station adapter and channel/sub-channel identifier so that they can be sent using the same channel broadcast to all stations but recognized by the one or those ones which are relevant, providing data to implement a unicast, multicast or broadcast addressing scheme at receiving site(s).

These and further advantages of the present invention are explained in more detail in the following description as well as in the claims with the aid of the accompanying drawings.

BRIEF DESCRIPTION OF THE DRAWINGS

FIG. 1 is a block diagram representing the main features of the present invention as implemented using a DDBS system.

FIG. 2 is a block diagram representing an alternative solution proposed by the present invention enabling feed-back or timing monitoring as implemented using a DDBS system, by connecting together up-link and down-link adapters.

FIG. 3 is a block diagram of a down-link adapter used by a computation center in order to be connected to a standard down-link receiver compatible with the above mentioned system.

FIG. 4 is a block diagram of an up-link adapter used by a remote monitoring station in order to be connected to a digital up-link station compatible with the above mentioned system.

FIG. 5 is an illustration of data rate conversion method, used by the above adapters, taking advantage of rate difference to allow insertion of data such as time-tagging information used by adapters to monitor transit time.

EXAMPLES OF PREFERRED EMBODIMENTS

As it has been discussed further above, remote monitoring stations, typically ground based, may be used in order to monitor signals related to the navigation of a satellite constellation. The data thus obtained is then provided to computation centers in charge of determining specific features of the satellites or signals provided by those satellites. According to the solution provided by the present invention, said data is provided to the computation centers by using the capability of a satellite system, such as the direct digital satellite broadcasting systems (DDBS), in broadcasting directly towards said centers using very low-cost receivers at said centers. Optionally, the computation systems may also be capable of up-link feed-back acknowledgement, timing information or other data to be transmitted to remote stations also equipped with said low-cost receivers providing end-to-end transmission loop.

Referring now to FIG. 1, a block diagram is shown representing a satellite based monitoring, measurement or data collection system comprising at least one satellite (2) from said DDBS system, one or more monitoring units (M) comprising a monitoring station (4) for monitoring, measurement or data collection, an up-link adapter (5) which will be discussed in further detail below and a digital up-link station (1) of a conventional type being capable of transmitting data in the up-link towards said DDBS satellite (2) which in turn broadcasts them to one or more computation units (C) comprising a computation center (3), a down-link adapter (7) which will be discussed in further detail below and a DDBS receiver (6). Said satellite (2) comprises an on-board processor (21) of any type known in the related art, for receiving said up-link data, multiplexing said data into a bit stream and broadcasting the multiplexed data bit stream directly to a plurality of computation units (C). Optionally the satellite is also capable of broadcasting towards a station similar to a monitoring unit (M) for feedback to the monitoring station (4).

A processing method for such on-board multiplexing of data (21) is known from U.S. Pat. No. 6,201,798 assigned to WorldSpace Management Corporation. Nevertheless the invention is not to be understood to be limited to the use of said method and other known methods may equally be applied for on-board multiplexing or combining of multi-source data, including when on-board multiplexing is provided by navigation satellites themselves.

The multiplexing of all up-link data into down-link channels is preferably done using TDM mode, tagged so as to identify which satellite on-board processor/down-link multiplex combination is in use, and optionally spread over the down-link spectrum. Preferably a periodic frame marker is used to ease time synchronization.

Remote monitoring stations (4) are used for monitoring, measurement or data collection related to the navigation features of a satellite and providing the data to a computation center (3). According to the solution proposed by the present invention, each remote monitoring station (4) in a monitoring unit (M) is connected to a digital up-link station (1) through an up-link adapter (5) which is capable of transforming the data related to the satellite navigation into data suitable for up-link transmission. The transformed data thus obtained is then passed on to the digital up-link station (1) which in turn transmits the data in the up-link direction towards a satellite (2) which is capable of performing the on-board processing through processor (21) of the up-link data and multiplexing said data into a direct down-link data stream. The digital up-link station may be, for example, a standard DDBS system up-link VSAT-type station; nevertheless other conventional stations may be equally used.

At the receiving side, each computation unit (C) is equipped with a computation center (3) and one or more conventional receiver(s) (6) which is (are) capable of receiving the down-link signal in a know manner. Said receiver (6) is connected to a respective computation center (3) through at least one down-link adapter (7) which is capable of transforming the down-link signal into data suitable for use in the computation center (3).

As it may be observed in FIG. 1, several up-link transmissions (e.g., transmission y and transmission z) towards a single (or redundant) digital direct broadcasting satellite (2) may be multiplexed by the on-board processor (21) of the satellite (2) into one down-link bit stream (e.g., transmission yz) which is transmitted towards a plurality of computation centers (3).

The adapter (7) at the computation unit (C) is able to extract data received from a given set of monitoring stations or station equipment (4) from a digital channel provided by receiver (6) as extracted from down-link satellite multiplex. Therefore all the receivers (6) and thus all the adapters (7) can receive data stream (e.g., transmission yz) containing data from the remote monitoring stations (4), all at the same time provided of course they are under the satellite coverage. Nevertheless at each adapter (7), only the data related to the respective computation center (3) (e.g., transmission y or transmission z) is extracted and provided thereto.

In order to distinguish the respective channels corresponding to each computation center (3), each remote up-link station (1) is allocated one of the individual digital channels available at the up-link and said channel is the one that is extracted by the receiver (6) at the receiving side to be provided to the computation center (3) through the adapter (7).

Optionally, several remote channels or remote monitoring stations (4) can be grouped together using sub-multiplexing channel capabilities (also called service components in the related art) of DDBS systems, enabling complex remote stations to be handled or even to realize local hubs of remote monitoring stations should this be needed. In such cases, adapter (7) is able of processing several sub-channels in parallel and provide them to computation center (3).

Referring now to FIG. 2, an alternative embodiment is depicted according to which each remote monitoring station (4) may optionally be connected to an up-link adapter (5) itself connected to a standard DDBS receiver (6) via a down-link adapter (7) to synchronize message transmissions using the down-link channel multiplex content which is preferably transmitted in TDM mode and preferably marker indexed as a synchronization signal.

Optionally, this synchronization scheme may also be used for sub-multiplexing up-link channels transmission within a digital channel, should DDBS system be in use, and receivers (6) or adapters (7) are able to recognize several sub-channels or service components part of the same channels.

Optionally furthermore, up-link adapters (5) can extract from channel multiplex content feed-back inserted therein by down-link adapters (7) from computation centers sites enabling them to implement end-to-end protocols or to estimate round-trip delays, i.e. time needed to transfer data from up-link adapter (5) to down-link adapter (7). This path is illustrated in FIG. 2 as (a)+(b). Likewise the, and also the time in reverse direction may be estimated, the path of which is represented in FIG. 2 as (c)+(d).

FIG. 3 shows a block diagram representing an example of a down-link adapter (7) in more detail. In said figure, input (IN) is for connection to a standard DDBS receiver (6), whilst a computation center (3) can be connected at a separate port referenced as (IN/OUT/CNF). The adapter preferably has a front-panel keyboard and a port (CTL) to a standard video terminal unit for default setting and debugging. In this manner the computation center equipment (3) thus can load station/channels/sub-channels configuration table(s) into a down-link adapter management processor (79) preferably through a down-link adapter protocol manager (78) and preferably using IP connection suite. The processor (79) can then send selection data (SEL) to the receiver (6) and preferably to a front-panel display (70) since the receiver (6) may not have a corresponding input, thus requiring manual setting.

Channel synchronizer (71) can recognize and extract useful data related to remote monitoring stations (4) from channel data using preferably framing embodied into channel signaling data originated at the up-link station (1) and/or frame markers set by satellite processor (21). Depending upon system and monitoring station configurations as driven by processor (79), channel synchronizer (71) can set one or more (1 . . . n) sub-channel synchronizer (72.n) to be associated to one individual unit inside monitoring stations (4) such as an individual navigation monitoring channel as known by the computation center (3).

A sub-channel synchronizer (72.n), recognizes and extracts related data frames from channel data, and provides them to a de-framing/re-framing synchronizer, frame and rate converter (73.n), which may be a simple buffer in the case the monitoring station (4) uses the same framing features than the broadcasting system and the receivers (6). In case framing and/or message rate is to be adapted to a system external synchronization signal provided at an input (SYS_SYNC) such as for instance GPS time, the synchronizer (73.n) buffers the data frames as appropriate and converts rates to deliver them in due time or at due rate as data messages. Otherwise the synchronizer (73.n) uses internally generated timing signal, derived preferably from DDBS channel time marker data, or time internally computed through time recognized by a loop data detector (74.n).

The Loop data detector (74.n) recognizes special messages or message fields originating from a remote up-link adapter (5) through the satellite transmission, and sends them to an output (XLOOP) through inter-unit interface (77) which group exchanges from several sub-channel units. The loop data detector (74.n) may optionally pass time data to the adapter processor (79) through a protocol driver (78) for display on front-panel (70). The loop data detector (74.n) may also recognize feed-back messages originating from protocol driver (78) and make them available to the output port (XLOOP). It can also detect whether or not the output port (XLOOP) is connected to a peer up-link adapter (5) and react according to settings originating from the processor (79). The processor (79) can set a list of special messages fields for the detector (74.n) to enable it to react accordingly.

Messages may be internally stored and/or uncompressed by a message sequencer (75.n) to be delivered as logical uninterrupted suites of messages should this be required by application, and then delivered to the protocol adapter (78).

FIG. 4 shows a block diagram representing an example of an up-link adapter (5) in more detail. It is readily appreciated from the figure that the general structure of this adapter is substantially similar to that of a down-link adapter as shown in FIG. 3, e.g., with front-panel display (50), channel synchronizer (51), and sub-channel synchronizer (52.n), although individual sub-channels have their dedicated input. In FIG. 4, the input (OUT/IN) of the adapter (5) is connected to a remote monitoring station equipment (4) (FIG. 1), whilst a broadcast station (1) is connected at the output port (OUT). The adapter (5) preferably has a front-panel keyboard and a port (CTL) to a standard video terminal unit for default setting and debug. The remote monitoring station equipment (4) thus can load station/channels/sub-channels configuration table(s) into a down-link adapter management processor (59) through a main up-link adapter protocol manager (58.0), preferably using IP connection suite. The processor (59) can then feed the broadcast station (1) sub-channel header data through port (SCH) using channel/sub-channel arrangement information according to configuration consistent with the one used by the down-link adapter. Each monitoring or monitoring chain of monitoring stations (4) is connected to one of the (OUT/IN) port(s) through an associated protocol manager (58.n).

Messages suites may internally be stored, split by message splitter (55.n), according to need, thus transmitted to the rate and frame converter (53.n). A loop data detector (54.n) recognizes special messages or message fields originating from a down-link adapter (6) connected to a port (XLOOP) through inter-unit interface (57) which group exchanges from/to several sub-channel units. Loop data detector (54.n) may also recognize feed-back messages destined to protocol driver (58) and makes them available to it. It can optionally pass time data to the adapter processor (59) through sub-channel protocol manager (58.n) and channel protocol manager (58.0). It can detect whether or not the output port (XLOOP) is connected to a peer down-link adapter (7) and react according to setting originating from the processor (59), which can set a list of special messages fields for the detector (54.n) to react accordingly.

Referring now to FIG. 5, a method for use in both rate converters described above—shown as (73.n) in FIG. 3 and (53.n) in FIG. 4—will be discussed. This method takes benefit of the fact that the monitoring rate is lower than the DDBS channel framing rate.

In FIG. 5, the graph represented by (A) shows signals related to data clocking synchronized with system time. The graph represented by (B) shows messages provided by the above mentioned monitoring station at times synchronized with (A), the duration of which is made compatible with the length of a message (D) by any known method such as data compression or simply by stripping application-dependent fix data such as standard headers or other deterministic data as it is very usually present in such systems.

The graph represented by (C) shown the DDBS channel framing signal, whilst (D) represents DDBS channel frames.

For up-link adapters rate and frame converter (53.*n*), a first message (B.1) is sent through a channel frame (D.1). The next message (B.2) cannot be sent to the next channel frame (D.2) because data is not yet fully available. Therefore, a Marker frame is generated which is represented within the channel frames in FIG. 5 as a bloc with no shading. The subsequent frame (D.3) will thus be used for sending the next message (B.2), leaving frame D.2 available for inserting any special data that can be processed by loop detectors (54.*n* and 74.*n*) above. Next, the data related to the subsequent message (B.3) will be inserted into the next channel frame (D.4) frame and the process is repeated as needed. Therefore, each time the start time of a DDBS frame occurs before a message is finished, a Marker frame is created. Marker frames are used to transfer time-tagging data such that data transit can be closely monitored, thus enabling to monitor round trip transit time. Therefore the solution provided by the present invention provides a very direct link which is created between a remote monitoring station and a computation center without requiring alternate support routes, using low cost features of a satellite system made usually for small broadcasters and mass-product receivers. This link can be made mono or bi-directional by connecting adapters (5) and (7) together at one or more sites.

The solution of the present invention further enables several backup computers, working in hot-redundancy and located at several remote locations to process actually the same data in real-time, all substantially at the same time, without a need that the data is re-dispatched, buffered or time-compensated. This feature is of importance when safety applications are involved such as air traffic control.

Another advantage of the present invention is that it eliminates the need for installing several VSAT antennas at computation centers, since a low-cost mass-product GPS-like antenna is sufficient for the purposes of the invention, thus making the choice of computer center locations, or expansion capability far more easier.

Further advantages of the solution provided by the present invention are as follows:
avoiding unnecessary round-trip delays, waste of time*bandwidth and re-routing;
direct connection between remote monitoring stations and all the computations centers working real-time in parallel;
very well controlled transit delays, end-to-end, towards all computers centers at the same time;
capability to actually monitor said round-trip delays which may be of importance in application such as air-traffic control where there is a guaranteed time-to-alert to meet;
capability to have a return link for acknowledgments and round-trip transit time monitoring;
suppress re-routing between nominal and backup computation center sites, avoiding single points of failure;
capability to redundant if more than on satellite is used;
very easy connection of a new remote monitoring station, even in locations not covered or not accessible to conventional telecommunication carriers;
the invention can be used for ground-based, sea-based or even space-based stations;
capability, to broadcast time valid at down-link adapters, compensated from transit time.

The invention enables to deploy faster and operate more easily a synchronous network over a wide area for application such as Satellite Navigation Augmentation Systems.

The invention typically enables to deploy quickly reduced monitoring systems for evaluation purpose, without any terrestrial connections in countries where infrastructure is not sufficient.

The invention enables to have those stations even not accessible by terrestrial links, such as space-orbiting monitoring stations or maritime stations located in deep oceans.

The collection of data from numerous remote monitoring stations may be performed from sites distributed over several continents, with a very limited infrastructure and with a low operating cost.

The invention claimed is:

1. A satellite-based monitoring, measurement or data collection system comprising:
   a monitoring, measurement or data collection system having a plurality of monitoring stations for remote monitoring, measurement or data collection and for providing data to respective computation centers;
   a satellite system using at least one satellite having an on-board processor for multiplexing up-link data received and broadcasting said multiplexed data in a down-link transmission; and
   a monitoring station having a receiver for synchronizing message transmission using data extracted from down-link channel multiplex content,
   wherein:
   said up-link data received by said satellite comprises a digital channel corresponding to a respective one of said computation centers;
   said respective computation center is connected to a down-link adapter connected to a receiver or group of receivers;
   said down-link adapter is adapted for extracting, from said down-link transmission, said digital channel corresponding only to the said respective computation center.

2. A system according to claim 1, wherein each of said monitoring stations is connected through an up-link adapter to the satellite up-link broadcasting station.

3. An up-link adapter for converting signals received from a monitoring station of a monitoring, measurement or data collection system, into signals suitable for digital up-link transmission as claimed in claim 2.

4. An up-link adapter according to claim 3 for converting data message format from said monitoring station to an up-link format of said satellite system and/or converting data rate to an uplink rate adapted to said satellite system.

5. A method for use in the up-link adapter of claim 4 wherein a data message is delayed before being put into a next frame generated at a digital direct broadcast satellite channel rate, using a frame produced faster than needed by the rate of monitoring, measurement or data collection, thus giving rise to a so-called marker frame carrying data such as timing data.

6. A system according to claim 1, wherein said satellite system is a digital direct broadcast satellite system.

7. A system according to claim 1, wherein at least one of said monitoring stations has at least one channel from the up-link transmission allocated thereto.

8. A system according to claim 7, wherein several remote channels, or several monitoring stations are grouped together using sub-multiplexing channel capabilities of said digital direct broadcast satellite system.

9. A system according to claim 1, wherein time and/or date is broadcast to said down-link adapters, and optionally to said digital direct broadcast satellite receivers.

10. A satellite-based monitoring, measurement or data collection system comprising:
- a monitoring, measurement or data collection system having a plurality of monitoring stations for remote monitoring, measurement or data collection and for providing data to respective computation centers;
- a satellite system using at least one satellite having an on-board processor for multiplexing up-link data received and broadcasting said multiplexed data in a down-link transmission; and
- a down-link adapter extracting at least one channel from a down-link transmission and providing data to another adapter connected to a monitoring station, wherein:
- said up-link data received by said satellite comprises a digital channel corresponding to a respective one of said computation centers;
- said respective computation center is connected to a down-link adapter connected to a receiver or group of receivers; and
- said down-link adapter is adapted for extracting, from said down-link transmission, said digital channel corresponding only to said respective computation center.

11. An uplink adapter according to claim 10 wherein said up-link adapter receives data from another adapter such as a down-link adapter.

12. A method for interconnecting adapters as in claim 11, wherein data is returned from a down-link adapter to an up-link adapter transferring time information and/or data information between said adapters.

13. A system according to claim 11 wherein a computation center broadcasts through a digital direct broadcast satellite, to said monitoring stations by means of an up-link adapter incorporated therein and a monitoring station having a down-link adapter detects a channel specifically addressed thereto, providing data to said monitoring station, said data being usable for implementing a unicast, multicast or broadcast addressing scheme.

14. A satellite-based monitoring, measurement or data collection system comprising:
- a monitoring, measurement or data collection system having a plurality of monitoring stations for remote monitoring, measurement or data collection and for providing data to respective computation centers; and
- a satellite system using at least one satellite having an on-board processor for multiplexing up-link data received and broadcasting said multiplexed data in a down-link transmission, wherein:
- said up-link data received by said satellite comprises a digital channel corresponding to a respective one of said computation centers;
- said respective computation center is connected to a down-link adapter connected to a receiver or group of receivers;

said down-link adapter connected to a receiver or group of receivers is adapted for extracting, from said down-link transmission, said digital channel corresponding only to the said respective computation center; and
- data related to time and/or date is/are broadcast through a digital direct broadcast satellite system and where a frame received at a digital direct broadcast satellite channel rate, is converted into a message at a monitoring, measurement and data collection rate with the exception of a marker frame carrying data such as timing data.

15. A system according to claim 14 wherein said timing data is used for evaluating transit time or for providing time to any other unit connected thereto such as a display.

16. A system according to claim 15 wherein a transit time of a message from a time instant it is transmitted from an up-link adapter until a time instant it is received by a down-link adapter through a digital direct broadcast satellite is evaluated.

* * * * *